United States Patent
Benecke et al.

(12)
(10) Patent No.: US 6,797,753 B2
(45) Date of Patent: Sep. 28, 2004

(54) PLASTICIZERS DERIVED FROM VEGETABLE OILS

(75) Inventors: Herman P. Benecke, Columbus, OH (US); Bhima R. Vijayendran, Dublin, OH (US); Joel D. Elhard, Hilliard, OH (US)

(73) Assignee: Battelle Memorial Institute, Columbus, MA (US)

( * ) Notice: Subject to any disclaimer, the term of this patent is extended or adjusted under 35 U.S.C. 154(b) by 70 days.

(21) Appl. No.: 09/849,071

(22) Filed: May 4, 2001

(65) Prior Publication Data

US 2002/0013396 A1 Jan. 31, 2002

Related U.S. Application Data

(63) Continuation-in-part of application No. 09/596,971, filed on Jun. 20, 2000, now abandoned.

(51) Int. Cl.[7] .................. C08K 5/1515; C08L 27/06

(52) U.S. Cl. .............. 524/114; 524/569; 530/232; 544/528; 544/561; 554/149; 554/170; 554/227

(58) Field of Search .................. 524/114, 569; 530/232; 544/528, 561; 554/149, 170, 227

(56) References Cited

U.S. PATENT DOCUMENTS

| 2,029,851 | A | | 2/1936 | Arvin |
|---|---|---|---|---|
| 3,050,480 | A | * | 8/1962 | Budde .................. 528/361 |
| 3,218,296 | A | * | 11/1965 | Sidi .................... 528/232 |
| 3,236,795 | A | * | 2/1966 | Graver .................. 523/400 |
| 3,493,414 | A | * | 2/1970 | Hastings ................ 428/151 |
| 4,474,940 | A | * | 10/1984 | Wilk et al. ............. 528/295.3 |
| 4,486,561 | A | * | 12/1984 | Chung et al. ........... 524/107 |
| 5,030,511 | A | * | 7/1991 | Moffitt ................. 428/336 |
| 5,643,501 | A | | 7/1997 | Buan et al. |
| 6,326,518 | B1 | * | 12/2001 | Duvall et al. ............ 568/46 |

FOREIGN PATENT DOCUMENTS

| EP | 0 358 181 A2 | 3/1990 |
|---|---|---|
| JP | 0 510 521 A2 | 10/1992 |

* cited by examiner

*Primary Examiner*—Peter Szekely
(74) *Attorney, Agent, or Firm*—Klaus H. Wiesmann

(57) ABSTRACT

Compositions and methods for plasticizing polyvinyl chloride polymers where the plasticizers contain fatty acids derived from vegetable oils and the fatty acids are substantially fully esterified with an alcohol (monool or polyol), the fatty acids having unsaturated bonds that are substantially fully epoxidized, and wherein the fatty acids are added substantially randomly to one or more hydroxyl sites on the alcohol. The plasticizers may be added in amounts between about 10 to 230 pph of PVC resin.

29 Claims, No Drawings

PLASTICIZERS DERIVED FROM VEGETABLE OILS

This application is a continuation in part of U.S. patent application Ser. No. 09/596,971, filed Jun. 20, 2000, now abandoned.

BACKGROUND OF THE INVENTION

This invention relates to polyvinyl chloride plasticizers which have been derived from vegetable oil, their method of making and their method of use.

Polyvinyl chloride (PVC), the best known and most widely used of the vinyl plastics, is most often utilized in one or both of two general forms: substantially unplasticized PVC, and plasticized PVC. The substantially unplasticized form of PVC, commonly known as rigid PVC, is used for pipework, ducts, and similar applications in which high resistance to chemical substances is required. The plasticized form of PVC is widely useful for numerous applications including films, sheeting, cable coverings, moldings, stationary products, conveyer belting, toys, and hose. Plasticized PVC is also used as a substitute for leather and may be used as a fabric for clothing and various furnishings.

Among the most important physical characteristics of plasticized PVC are flexibility and pliability. These physical characteristics are achieved by compounding PVC resin with one or more materials which serve as plasticizers following their addition to the PVC resin. Broadly defined, plasticizers are high boiling point liquids which are used as ingredients in lacquers and certain plastics such as PVC. These liquids do not evaporate from the matrices they are added to, but rather preserve the flexibility and adhesive power of cellulose lacquer films or the flexibility of plastic sheeting and film. The majority of PVC plasticizers currently utilized in industrial processes are petroleum-derived phthalates and benzoate compounds. Dioctyl phthalate (DOP) and diallyl phthalate (DAP) are examples of petroleum-derived compounds commonly used as primary plasticizers for PVC.

While effective as primary plasticizers, petroleum-derived plasticizers are subject to several significant limitations. In addition to being processed from a nonrenewable source, petroleum-derived PVC plasticizers are often expensive to produce due to fluctuations in the price and availability of crude oil. Furthermore, petroleum-derived plasticizers such as DOP are suspected to disrupt human endocrine activity (see *Modern Plastics*, January 1998, p35). Therefore, it may be desirable or even necessary to limit the use of petroleum-derived plasticizers in certain situations, especially when the plasticized product comes into human contact at ambient temperature and especially at elevated temperature. Thus, there is a need for a low-cost, non-toxic, environmentally safe alternative to the petroleum-derived plasticizers that are currently incorporated into a great many consumer products. PVC plasticizers which are derived from vegetable oils provide such an alternative.

Unmodified vegetable oils are largely incompatible with polyvinyl chloride resin. However, certain modified derivatives of vegetable oils, such as epoxidized soybean oil, are compatible with PVC resin and provide an alternative to petroleum-based plasticizers. Furthermore, vegetable oils are derived from a renewable source, namely plants, and are not likely to create the potential for physiological disturbances or other injuries to persons coming into contact with products which require plasticizers in their composition.

Epoxidized soybean oil is currently used to a limited extent as a secondary plasticizer and co-thermal stabilizer in the processing and manufacturing of flexible, semi-rigid and rigid PVC products. Thermal stabilizer are needed in PVC formulations because at typical extrusion processing temperatures, PVC polymer undergoes slow elimination of hydrochloric acid because of labile beta hydrogen atoms. This leads to formation of isolated double bonds followed by fast allyl activated dehydohalogenation resulting in the formation of dark colored conjugated polyenes. This degradation, if not controlled, is auto-catalytic. Epoxidized soybean oil has been found useful in the prior art as a stabilizer in typical PVC formulations at a level of 2–3%, but increased thermal stabilization has been determined to be up to 27 pph PVC. To further impart high temperature stability, metal soaps such as zinc and calcium stearates are included as thermal stabilizers in combination with epoxidized soybean oil in PVC resins.

Despite the usefulness of epoxidized soybean oil as a thermal stabilizer, at use levels of about 5% (and in some cases up to 15%) in the compounded PVC resin, ESO tends to exude due to poor compatibility with the resin matrix at high levels. This incompatibility makes partially esterified and epoxidized soybean oil largely unsuitable as a primary plasticizer for use in PVC resins in high concentrations because primary plasticizers often represent up to 50% of the PVC matrix. The poor compatibility of partially esterified and epoxidized soybean oil with PVC resin is presumably due to factors such as the non-optimized match of the solubility parameter of partially epoxidized soybean oil polarity with that of PVC. Thus, for soybean oil or other vegetable oil derivatives to be useful as primary plasticizers, a useful oil must be modified to significantly improve its compatibility with PVC resins. Importantly, any chemical modifications should not significantly diminish the thermal stabilizing properties of a preferred vegetable oil.

Polyol esters have been used in PVC compositions as disclosed, for example, in U.S. Pat. No. 4,421,886 issued to Worschel et al., which discloses PVC compositions wherein the partial ester of pentaerythritol with fatty acids is used in combination with a polybasic lead compound as a stabilizer/lubricant combination. U.S. Pat. No. 4,605,694 issued to Walker discloses a plasticized PVC composition which includes a trimellitate ester, and a pentaerythritol alkanoic acid ester. U.S. Pat. No. 5,886,072 issued to Linskey et al. discloses a flame retardant composition which includes a pentaerythritol ester plasticizer used with PVC resin along with other plasticizers. U.S. Pat. No. 5,430,108 issued to Schlosberg et al. also discloses a plasticized PVC composition which includes a pentaerythritol alkanoic acid ester with mixed $C_5$, $C_7$ and $C_9$ alkanoic acids.

The present invention provides unique combinations of plasticizers formed with substantially fully esterified and substantially fully epoxidized fatty acids from the fatty acids derived from commonly available vegetable oils.

BRIEF SUMMARY OF THE INVENTION

Accordingly, these and other disadvantages of the prior art are overcome by the present invention which provides plasticizers derived from vegetable oil which are highly compatible with polyvinyl chloride resin, and as such are excellent for use as primary plasticizers in PVC resins. Typically, vegetable oil-based plasticizers can be used in PVC resins only at levels of 15% or less. The modified vegetable oil-based plasticizers of the present invention are significantly better than commercially available vegetable oil-based plasticizers, such as the commercially available ESO, and may be used at levels above 15%. Other embodiments provide for levels of plasticizers above about 20%. A typical upper limit for plasticizer materials of the present invention is about 50% although higher levels up to 70% can be used. It is expected that the higher concentrations of plasticizers with high epoxy content will provide additional thermal stabilization. Thus the materials of the invention provide for high and effective levels plasticizer for PVC formulations without evaporating or exuding from the PVC matrix. Furthermore, certain embodiments of the present invention exhibit both comparable plasticizing performance, and reduced migration tendencies as compared to the current industry standard, dioctyl phthalate (DOP), which is derived from petroleum feed stock. The plasticizers of the present invention are also effective co-thermal stabilizers of PVC resins, and are particularly effective when combined with conventional metal soaps or other commercially available thermal stabilizers.

In a broad embodiment, the improved vegetable oil-based plasticizers of the present invention are made by a preferred method which includes the basic steps of (i) creating ester linkages by attaching fatty acids derived from vegetable oils (e.g., oleic, linoleic, linolenic acid, and palmitoleic acid, etc.) to monoalcohols (monools) or polyalcohols (polyols) by means of direct esterification; and (ii) epoxidizing the esterified products (which contain saturated or unsaturated fatty acids) from step (i) to increase the polarity and increase the solubility parameter of these reaction products close to the solubility parameter of PVC. Presumably, increasing the polarity and solubility parameters increases the compatibility of the vegetable-oil based plasticizer with polyvinyl chloride resin. Alternatively, the first step of this broad method (direct esterification) may be substituted with the step of transesterification, wherein a monool or polyol reacts directly with the vegetable oil to produce the desired product plus glycerin, and wherein a monool or polyol reacts with the lower alkyl ester of vegetable oil acid to produce the desired product plus the lower alcohol. Typically the saturated and unsaturated fatty acids are distributed randomly on each molecule of a polyol that is esterified with the fatty acids. This process also results in a random mix of esterified fatty acids.

An alternative broad embodiment includes the steps of (i) interesterification of one ester with another ester, or of a vegetable oil such as soybean oil with another vegetable oil such as linseed oil; and (ii) subsequent epoxidation of the product of the interesterification reaction. Interesterified oil may be further reacted with alcohols (monools and polyols) by transesterification of the interesterified product, followed by epoxidation of the transesterified, interesterified product. The immediately above mentioned alternative may also be used here.

The modified vegetable-oil based plasticizers of the present invention are derived from soybean oil, and include: (i) epoxidized pentaerythritol tetrasoyate; (ii) epoxidized propylene glycol disoyate; (iii) epoxidized ethylene glycol disoyate; (iv) epoxidized methyl soyate; (v) epoxidized sucrose octasoyate; and (vi) the epoxidized product of soybean oil interesterified with linseed oil.

Therefore it is an object of the present invention to provide vegetable oil-based plasticizers which are useful as primary plasticizers for vinyl plastics, and which can completely replace petroleum-based compounds, such as DOP, as the primary plasticizers used with vinyl plastics.

DETAILED DESCRIPTION OF THE INVENTION

A preferred embodiment of the present invention modifies soybean oil (I.V. value about 120–143) for use as a primary plasticizer and co-thermal stabilizer in PVC resins. It should be noted, however, that soybean oil is not the only oil useful with this invention. Preferred oils include any vegetable or plant fatty acid gylceride that is significantly unsaturated. Significantly unsaturated means that the vegetable oil typically has more than about 80% unsaturated fatty adds. Most preferably the unsaturation should be about 84% or higher. Typically the oil has an iodine value, which is a measurement of the amount of double bonds in the fatty acids of the oil, that is about 100 and higher. Examples of other preferred oils as sources for fatty acid derivates include:

canola oil (I.V. value about 100–115),
corn oil (I.V. value about 118–128),
linseed oil (IV. value about 170–200),
rapeseed oil (I.V. value about 100–115),
safflower oil (I.V. value about 140–150),
sunflower oil (I.V. value about 125–140),
tall oil (I.V. value about 140–190), and
tung oil (I.V. value about 180) (and mixtures and derivatives thereof) all of which have an adequate number of unsaturated fatty acids (e.g., oleic, linolenic, linoleic) which are suitable for epoxidation. Note that, unless otherwise specified herein, percent (%) refers to weight percent.

Typically the unsaturated fatty acids useful in the invention are selected from the random mix of unsaturated fatty acids present in the vegetable oil, the saturated fatty acids are likewise selected from the random mix of saturated fatty acids present in the vegetable oil. The identifying portions of saturated fatty acids present are termed saturated acyl groups that are derived from saturated fatty acids and are typified by palmitoyl, stearoyl, arachidoyl, behenoyl, myristoyl, and margaroyl.

The term "polyvinyl chloride" (PVC) as used herein is intended to cover those homo- and copolymer resins of vinyl chloride known to persons of ordinary skill in the art. Generally speaking, copolymers of vinyl chloride (containing up to about 20% of such monomers as vinyl acetate, propylene, ethylene, diethyl maleate, dimethyl fumarate, and other ethylenically unsaturated monomers) are intended to be covered. The term "polyvinyl chloride" as used herein is intended to cover those homo- and copolymer resins of vinyl chloride known to persons of ordinary skill in the art. Generally speaking, copolymers of vinyl chloride (containing up to about 20% of such monomers as vinyl acetate, propylene, ethylene, diethyl maleate, dimethyl fumarate, and other ethylenically unsaturated monomers) are intended to be covered.

The compositions of the plasticized polyvinyl chloride resins of the present invention may be formulated, in addition to the above described plasticizers, with various kinds of additives according to need. For example, additives which contribute to improvement of properties such as heat stability, lubricity, weathering resistance and the like, are exemplified by metal soaps such as calcium stearate, zinc stearate, lead stearate, barium stearate, cadmium stearate and the like, tribasic lead sulfate, dibasic lead phosphite, organotin compounds such as dibutyltin dilaurate, dibutyltin dimaleate, di-n-octyltin mercaptide, dimethyltin mercaptide and the like as a stabilizer, and esters such as butyl stearate, aliphatic acid amides such as ethylene bistearamide, higher fatty acids such as stearic acid and polyethylene waxes as a lubricant, fillers, anti-oxidants, ultraviolet absorbers, anti-static agents, anti-fogging agent, pigments, dye-stuffs, crosslinking aids and the like.

An important step in one embodiment of the present invention is to assure that the mixture of fatty acids present in triglyceride in the vegetable oils are removed from the triglycerides and the mixture of resulting saturated and unsaturated fatty acids, known as a vegetable acids, are used to esterify specified polyols or monools. Specifically mixtures of fatty acids derived from soybean oil are called soy acid. Soy acid may then be reacted with a polyol having a plurality of sites available for esterification (such as pentaerythritol to produce a pentaerythritol tetrasoyate). The resulting product esterified polyol will then have fatty acids from the original vegetable oil randomly distributed on the esterified polyol. This assures that each molecule of the esterified polyol will have a high plurality of unsaturated fatty acids to provide optimum compatibility with PVC after complete epoxidation. The resulting product will also contain a random mix of molecules esterified with the monool or the polyol.

A preferred embodiment of the present invention provides a process for modifying soybean oil for use as a primary plasticizer in PVC. This process includes the general steps of reacting fatty acids derived from vegetable oil with an alcohol (monool or polyol) to create ester linkages between the fatty acids and the alcohol by means of esterification, transesterification, or interesterification reactions, followed by epoxidation of the product of these esterification, transesterification, or interesterification reactions. Presumably, epoxidation increases the polarity and solubility parameter of the esterification, transesterification, or interesterification reaction products, resulting in increased compatibility of the vegetable-oil based plasticizer with polyvinyl chloride resin. Definitional descriptions of esterification reactions, transesterification reactions, interesterification reactions, and epoxidation reactions are provided below.

Esterification is defined as the reaction of a fatty acid (e.g., carboxylic acid) with an alcohol to produce an ester and water. These reactions are equilibrium reactions and are generally driven to completion by removal of water, typically by distillation if water is the lowest boiling component. This approach was used to create the ester linkages in the following preferred soybean oil-derived plasticizers: (i) epoxidized pentaerythritol tetrasoyate; (ii) epoxidized propylene glycol disoyate; and (iii) epoxidized ethylene glycol disoyate, discussed in greater detail below. The figure below illustrates a typical esterification reaction within the context of the present invention, wherein $RCO_2H$ is a mixture of fatty acids derived from soybean oil by hydrolysis of soybean oil, and R'OH represents alcohol functions in pentaerythritol, propylene glycol, or ethylene glycol.

$$RCO_2H + R'OH \rightarrow RCO_2R' + H_2O$$

Transesterification is defined as the reaction of an ester with an alcohol to produce a derived ester and the alcohol in the original ester. These reactions are equilibrium reactions and are generally driven to completion by removal of the product alcohol, typically by distillation if this alcohol is the lowest boiling component. This approach was used to create ester linkages in the following preferred soybean oil-derived plasticizers: (i) epoxidized methyl soyate, and (ii) propylene glycol disoyate, the former discussed in greater detail below.

The figure below illustrates a typical transesterification reaction within the context of the present invention, wherein $RCO_2R'$ represents triglycerides derived from soybean or other vegetable oils, and R"OH represents pentaerythritol, propylene glycol, ethylene glycol, or methanol.

$$RCO_2R' + R''OH \rightarrow RCO_2R'' + R'OH$$

Interesterification involves reaction of two reactant esters to produce two product esters by interchange of original alcohol functions. Again, this reaction may be driven to completion by removal of one of the product esters, typically by distillation if one of the product ester is the lowest boiling component. Interesterification is used to prepare the ester linkages in the plasticizer sucrose octasoyate by the reaction of sucrose octaacetate and methyl soyate which also produces methyl acetate that is removed by distillation. Soybean oil was also interesterified with linseed oil (with a higher IV value) to produce epoxidized, interesterified soybean oil. This interesterification process serves to increase the average number of double bonds in the modified triglyceride compared to those present in soybean oil. This significantly reduces the percentage of triglyceride molecules that have only zero, one, or two double bonds for subsequent epoxidation, thus leading to reduced migration, exudation, volatilization, and the like.

The figure below illustrates a typical interesterification reaction within the context of the present invention, wherein $RCO_2R'$ represents sucrose octaacetate and $R''CO_2R'''$ represents methyl soyate, or alternatively wherein $RCO_2R'$ represents soybean oil and $R''CO_2R'''$ represents linseed oil.

$$RCO_2R' + R''CO_2R''' \rightarrow RCO_2R''' + R''CO_2R'$$

Interesterification of soybean oil with other vegetable oils results in complete randomization of all fatty acid groups present in a mixture of preferred vegetable oils. Thus, interesterification of soybean oil with a vegetable oil such as linseed oil or safflower oil, which have a higher percentage of highly unsaturated fatty acids (e.g., linolenic acid) than soybean oil, followed by epoxidation, decreases the percentage of non-epoxidized or minimally epoxidized ESO molecules. Presumably, it is these non-epoxidized or minimally epoxidized ESO molecules which are primarily responsible for exudation from PVC due their low solubility in or incompatibility with PVC.

In an alternative embodiment, interesterified oil is further reacted with alcohols (monools and polyols) by transesterification of the interesterified product, followed by epoxidation of the transesterified product.

Epoxidation is defined as the addition of an oxygen atom across a carbon-carbon double bond to create epoxide (or oxirane) functionality. Epoxidation reactions are typically performed with percarboxylic acids or other peroxy compounds. The figure below illustrates a typical epoxidation reaction within

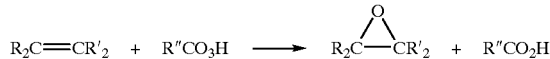

the context of the present invention, wherein R and R' are alkyl, substituted alkyl or hydrogen, and R" is aryl, substituted aryl, alkyl, or hydrogen.

The vegetable oil derivatives of the present invention are epoxidized for several reasons. Firstly, the fatty acid esters of pentaerythritol, sucrose, propylene glycol and ethylene glycol are minimally compatible (i.e., minimally soluble) with PVC resin. However, these compounds become compatible with PVC when their long chain fatty acid groups are epoxidized. In the present invention, increasing compatibility of soybean oil with PVC resin by means of randomization of fatty acids, substantially complete esterification, and substantially full epoxidation results in low migration and exudation rates of this material in PVC resins or matrices.

An additional reason for epoxidizing preferred vegetable-oil based plasticizers is that epoxide functionality significantly contributes to the thermal stability of the PVC matrix.

Commercially available epoxidized soybean oil is typically used in concentrations of about 2 to 5% in PVC resins, and is used as a secondary thermal stabilizer in combination with certain metal salts, which are considered the primary thermal stabilizers in PVC matrices. In current industrial formulations, DOP serves as the primary plasticizers, but does not contribute to thermal stability, whereas typical epoxidized soybean oil is included only for its marginal thermal stabilization functionality.

The present invention provides vegetable oil-derivatives which are typically useful alone as a primary plasticizer and also fulfill a dual role as both the primary plasticizer and the thermal stabilizer. In alternate embodiments, metal salts may be added to further enhance thermal stability. When the vegetable oil or soybean oil-derived plasticizers of the present invention are compounded with PVC resins at concentrations of above 15%, preferably above 20% and most preferably above about 30% of the matrix weight, these materials are effective primary plasticizers and thermal stabilizers. The upper limit of the soybean derived plasticizers is about 70% of the matrix weight. These materials, in combination with metal soaps, are highly effective as thermal stabilizers due to the high epoxide concentrations contributed by these materials. Typically the materials may be used without combination with the metal salts and are still effective thermal stabilizers. DOP, which is currently the most widely used industrial plasticizer, can function only as a plasticizer and has no significant thermal stabilization properties.

Typical and preferred embodiments of the present invention include the following soybean oil-derived plasticizers which are useful as primary plasticizers in vinyl plastics:
(i) epoxidized pentaerythritol tetrasoyate;
(ii) epoxidized propylene glycol disoyate;
(iii) epoxidized ethylene glycol disoyate;
(iv) epoxidized methyl soyate;
(v) epoxidized sucrose octasoyate; and
(vi) the epoxidized product of soybean oil interesterified with linseed oil (epoxidized interesterified soybean oil).

Typically other embodiments of the present invention include hydrolysis products of the equivalent vegetable oil-derived plasticizers, equivalent to those listed immediately above, that are derived from vegetable oils having about the same or higher amounts of unsaturated double bonds. These equivalent vegetable oils include oils having iodine values above 100. Typically oils can vary greatly in iodine number, even within the same type of vegetable oil depending on the growing site of the oil. Typically oils harvested from plants grown in cooler sites will have more double bonds and thus higher iodine values than those grown in warmer regions such as the tropics or subtropics. Accordingly vegetable oils having iodine values above 100 and/or chosen from the group of vegetable oils listed herein are useful in the invention. For purposes of comparison, derivatives of vegetable oils such as palm oil (I.V. about 50–55), coconut oil (I.V. about 7–12), as well as any other varieties of vegetable oil where the I.V. value is below 100, are outside the scope of the invention.

The following examples provide detailed methods for making each of the immediately above listed soybean oil-derived plasticizers and are not meant to limit the broad disclosure and teachings of the invention in any way.

EXAMPLE 1
Epoxidized Pentaerythritol Tetrasoyate

Epoxidized pentaerythritol tetrasoyate is a plasticizer typically having four epoxidized $C_{18}$ soy acid-derived chains attached by means of ester linkages to a central molecule, pentaerythritol. Epoxidized pentaerythritol tetrasoyate has a lower exudation rate when compounded with PVC resin than does epoxidized soybean oil, which has three epoxidized $C_{18}$ soy acid-derived chains attached via ester linkages to a central glycerin molecule. More highly branched and higher molecular weight polymer additives typically have lower diffusion rates compared to those additives which are less highly branched and which have lower molecular weights. Additionally, epoxidized pentaerythritol tetrasoyate has a lower exudation rate than DOP, since it is known that ESO has a lower exudation rate than DOP in PVC.

According to a preferred method, epoxidized pentaerythritol tetrasoyate was prepared in two steps. The first step required the direct esterification, without catalyst, of pentaerythritol with 1.10 to 1.12 equivalents of soy acid (4.4 to 4.5 moles of soy acid for every 1.0 mole of pentaerythritol) to form pentaerythritol tetrasoyate (see A. A. Blagonravova and A. M. Lazarev, 13 *J. Applied Chem. U.S.S.R.*, 879–882 (1940); H. Burrel, 37 *Ind. Eng. Chem.*, 86–89 (1945); and U.S. Pat. No. 2,029,851 to Arvin; all incorporated herein by reference). This approach leads to substantially full rather than partial esterification. Soy acid, as used herein, is the mixture of carboxylic acids obtained from hydrolysis of soybean oil. Substantially complete hydrolysis of soybean oil results in a mixture of acids termed soy acids and glycerin.

The reaction mixture was placed in typical distillation apparatus and heated to about 170° C. (at which temperature water started to evolve), and subsequently heated to about 235° C. and held at this temperature until approximately 100% of the expected water was collected. Obtaining the theoretical amount of water during this esterification indicated that all four hydroxyl groups of pentaerythritol had been esterified with soy acid. In case of the present invention, the proton NMR spectra of these materials obtained after removal of fatty acids was also in good agreement with the expected structure of the materials.

Excess fatty acids remaining after esterification can be removed by column chromatography, deodorization, or treatment with Magnesol®. Materials obtained by these processes typically result in pentaerythritol tetrasoyate with acid values of about 1.0 or lower. Acid values are defined as the milligrams of potassium hydroxide required to neutralize the alkali-reactive groups in 1 gram of material. Column chromatography is typically used for small-scale reactions, while deodorization and Magnesol® treatment is used for large-scale reactions. A typical large-scale reaction uses about 1400 grams of pentaerythritol (Aldrich; 10.3 mole) and 12,741 grams of soy acid (Emersol 315; 46.3 mole). The reaction was held at approximately 235° C. for about 12 hours (until water collection had ceased) with a slow nitrogen purge to obtain 12,070 grams of product with an acid value of about 1.0 after deodorization.

Deodorization is a technique wherein water vapor from an external source is allowed to pass through the pentaerythritol layer, which has been heated at high temperature to remove impurities such as soy acids. Typically, the apparatus used to perform deodorization includes a vacuum distillation system that also has a water-containing flask attached to the pentaerythritol-containing flask via an open tube that passes through a safety trap to prevent backflow of the pentaerythritol into the water-containing flask. This tube is open to the water vapor in the water-containing flask and is directed to the bottom of the pentaerythritol-containing flask so that the tube opening is significantly below the upper surface of the pentaerythritol. A vacuum is applied to a receiver flask that is attached to a condenser, that is attached to the pentaerythritol-containing flask. The pentaerythritol-containing flask is typically heated to 235° C. to 260° C., whereas the water-containing flask is mildly heated at a temperature not quite high enough to cause water condensation in the trap between the water-containing flask and the pentaerythritol-containing flask.

The second step involves epoxidation of the double bonds in pentaerythritol tetrasoyate to prepare epoxidized pentaerythritol tetrasoyate with any of a number of percarboxylic acids such as m-chloroperbenzoic acid, peracetic acid, or performic acid. Preferred peracids used for epoxidation are m-chloroperbenzoic acid and peracetic acid using standard approaches well known in the art (See D. Swem, *Organic Peroxides*, Volume 2, 355–533, Interscience Publishers, 1971; incorporated herein by reference). Epoxidized pentaerythritol tetrasoyate prepared by this method was characterized by epoxide numbers of approximately 7.8 (this represents about 100% epoxidation). Epoxide numbers are defined as the grams of epoxide oxygen atoms per 100 g of material.

Epoxidized pentaerythritol tetrasoyate has the basic formula:

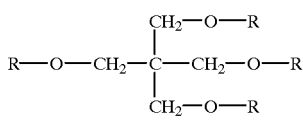

wherein R (each of the R's may be the same or different) is epoxidized linoleoyl, oleoyl, linolenoyl, or palmytoleoyl (in decreasing concentrations); or non-epoxidized palmitoyl, stearoyl, arachidoyl, behenoyl, myristoyl, or margaroyl (in minor concentrations). The material is substantially fully epoxidized.

EXAMPLES 2–3

Although epoxidized pentaerythritol tetrasoyate and epoxidized sucrose octasoyate (see below) have significantly reduced exudation rates in PVC compared to ESO (or DOP), these plasticizers also have viscosities which are greater than the viscosities of ESO or DOP. Increased viscosity may contribute to increases in both the mechanical torque and the time required for compounding a plasticizer with a PVC resin. Epoxidized propylene glycol disoyate and epoxidized ethylene glycol disoyate are plasticizers of the present invention which have lower viscosities than epoxidized pentaerythritol tetrasoyate and epoxidized sucrose octasoyate, and may therefore be compounded with PVC resin with less difficulty than higher viscosity materials.

Direct esterification was used to attach soy fatty acid to each of the two hydroxyl groups in both propylene glycol and ethylene glycol to yield propylene glycol disoyate and ethylene glycol disoyate, respectively. Instrumental analysis showed substantially complete esterification of both hydroxyl groups. Subsequent epoxidation of these intermediates by means of employing performic acid yields plasticizers with preferred viscosity characteristics because the epoxidized products have lower molecular weights and a lower number of epoxide groups per molecule compared to ESO. These will allow easier processing.

EXAMPLE 2

Epoxidized Propylene Disoyate

According to a preferred method, epoxidized propylene glycol disoyate was prepared in two steps. The first step involved the direct esterification, without catalyst, of a 2 to 1 molar mixture of soy acid (10,000 g, acid value 200.4, 35.72 moles) and propylene glycol (1359.1 g, 17.86 mole) to form propylene glycol disoyate.

A reaction flask was equipped with two connected distilling bulbs topped with a distillation head equipped with a heating mantle, mechanical stirring, thermometer and a gas inlet tube. The reaction vessel was sparged with a slow argon flow which exited into the receiver vessel and was maintained throughout the distillation. While maintaining vigorous stirring, the temperature of the reaction mixture was increased slowly such that the head temperature was maintained very close to 100° C., while maintaining distillation rates of about 0.9 to 0.3 ml/minute and presumably distilling mainly water.

When the distillation rate decreased to 0.3 ml/minute, the head temperature began to increase from 100° C., at which time the reaction mixture temperature was raised to approximately 194° C. The reaction mixture will be composed of approximately 19 percent soy acid (based on an acid value of 39.0). One of the distillation bulbs was removed and the argon flow increased through the reaction vessel. The reaction mixture temperature was increased slowly to approximately 240° C. while increasing the head temperature to 160° C., at which point a total of approximately 604 ml distillate was collected (94 percent of the theoretical water if the distillate is exclusively water) and the reaction terminated. Another 18 ml of a water insoluble oil may also be collected. The soy acid content of the reaction mixture was about 8.0 percent, based on an acid value of 15.9 at this stage of the distillation.

The majority of excess soy acid in the reaction mixture was removed by treatment with neat granular sodium carbonate (2456 g) while heating up to 90–100° C. and holding at approximately this temperature for a 24 hour period. A moderate mechanical stirring rate was maintained during this time while continually flushing the flask with argon. Significant foaming may occur initially due to the formation of carbon dioxide and water. Propylene glycol disoyate was isolated from this mixture by decanting and filtering the liquid phase. Much of the propylene glycol disoyate in the remaining solid was removed by high speed centrifugation at 8500 RPM (or higher) followed by decanting and filtering the resulting oil. Finally, the solid remaining from this step was extracted with methylene chloride and centrifugation used to help separate this mixture. Methylene chloride layers were stripped on a rotary evaporator with aspirator pressure and then with high vacuum while heating at 50° C. to remove traces of solvent. A total of about 8.33 kg propylene glycol disoyate was obtained by this process wherein fractions obtained by the purification methods described above have acid values of 0.58 or lower.

In the second step, epoxidized propylene glycol disoyate was prepared by epoxidation with performic acid prepared in-situ by the reaction of formic acid and hydrogen peroxide, see European Patent EP 0295534 A3 to Worschech, et al. (in German), filed Jun. 7, 1988, published Jan. 2, 1991; or its equivalent South African Patent Application ZA 8804250A (in English) filed Jun. 14, 1988, published Dec. 15, 1988; both incorporated herein by reference.

Epoxidized propylene glycol disoyate has the following formula:

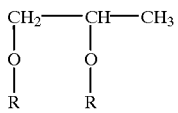

wherein R (each of the R's may be the same or different on a random basis) is epoxidized linoleoyl, oleoyl, linolenoyl, or palmitoleoyl (in decreasing concentrations); or non-epoxidized palmitoyl, stearoyl, arachidoyl, behenoyl, myristoyl, or margaroyl (in minor concentrations). The material is substantially fully epoxidized.

EXAMPLE 3

Epoxidized Ethylene Glycol Disoyate

A preferred method for producing epoxidized ethylene glycol disoyate consists of two steps. In the first step ethylene glycol disoyate was prepared at relatively small scale in two stages by reaction of an excess of soy acid and ethylene glycol in benzene by the azeotropic distillation of water while using a mineral acid as a catalyst. The amount of water obtained and thin layer chromatography evidence will indicated that the primary product obtained in this step was ethylene glycol monosoyate. This product was then subjected to moderately high temperature heating under rapid gas flow to promote acylation of the remaining hydroxyl group in ethylene glycol monosoyate by selective removal of water. In the second step epoxidized ethylene glycol disoyate was prepared in relatively small scale by epoxidizing ethylene glycol disoyate with meta-chloroperbenzoic acid in methylene chloride.

Epoxidized ethylene glycol disoyate has the following formula:

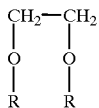

wherein R (each of the R's may be the same or different) is epoxidized linoleoyl, oleoyl, linolenoyl, or palmitoleoyl (in decreasing concentrations); or non-epoxidized palmitoyl, stearoyl, arachidoyl, behenoyl, myristoyl, or margaroyl (in minor concentrations). The material is substantially fully epoxidized.

EXAMPLE 4

Epoxidized Methyl Soyate

Epoxidized methyl soyate was prepared by epoxidation of commercially available methyl soyate with performic acid prepared in-situ by the reaction of formic acid and hydrogen peroxide (see European Patent EP 0 295534 A3 to Worschech, et al., incorporated herein by reference)

Epoxidized methyl soyate has the following formula:

wherein R is randomly selected from epoxidized linoleoyl, oleoyl, linolenoyl, or palmitoleoyl (in decreasing concentrations); or non-epoxidized palmitoyl, stearoyl, arachidoyl, behenoyl, myristoyl, or margaroyl (in minor concentrations). The mixed material is substantially fully esterified and epoxidized. The typical product contains a random mixture of fatty acids as found in the parent vegetable oil.

EXAMPLE 5

Epoxidized Sucrose Octasoyate

This example illustrates interesterification of a polysaccharide carboxylic acid ester with a fatty acid ester of a monool.

Epoxidized sucrose octasoyate was prepared to obtain a plasticizer with eight lengthy $C_{18}$ chains attached to a central molecule having eight hydroxyl groups (sucrose). This material has even lower exudation rates in PVC than epoxidized pentaerythritol tetrasoyate, which has four lengthy $C_{18}$ chains attached to a central molecule (pentaerythritol). Interesterification involved the reaction of sucrose octaacetate and methyl soyate which led to the efficient synthesis of sucrose octasoyate. Subsequent epoxidation of this intermediate resulted in the desired plasticizer.

Sucrose is a disaccharide with eight hydroxyl groups, thereby allowing the attachment of eight fatty acids per molecule in preparing sucrose octa(fatty acid), and epoxidation will lead to epoxidized sucrose octa(fatty acid). When sucrose was interesterified with soy fatty acids the resulting compound was sucrose octasoyate and subsequent epoxidation resulted in epoxidized sucrose octasoyate. Given the normal distribution of individual fatty acids, epoxidized sucrose octasoyate presumably contained about 11.5 to 12.3 epoxide groups per molecule which is predicted to lead to high retention (i.e., low exudation) in PVC.

Epoxidized sucrose octasoyate was prepared by the interesterification of sucrose octaacetate and methyl soyate (see C. C. Akoh and B. G. Swanson, *J. Food Science*, 55:1, 236–243 (1990); incorporated herein by reference). Epoxidation was performed with peracetic acid to obtain epoxidized sucrose octasoyate. According to a preferred method, the interesterified sucrose octaacetate and methyl soyate were epoxidized to obtain an oil which may be characterized as having an iodine value of about 2.75, an acid value of about 3.00, and an oxirane percentage of about 6.63%.

Epoxidized sucrose octasoyate has the following formula:

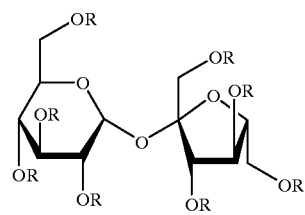

wherein R (each of the R's may be the same or different) is epoxidized linoleoyl, oleoyl, linolenoyl, or palmitoleoyl (in decreasing concentrations); or non-epoxidized palmitoyl, stearoyl, arachidoyl, behenoyl, myristoyl, or margaroyl (in minor concentrations). In some typical embodiments the material is substantially fully epoxidized.

EXAMPLE 6

Epoxidized Product of Soybean Oil Interesterifed with Linseed Oil

In one embodiment of the present invention, interesterification reactions of SBO with linseed oil were performed using 90:10 mixtures of SBO and linseed oil. In another embodiment of the present invention, interesterification reactions of SBO with linseed oil were performed using 70:30 mixtures of SBO and linseed oil. In still another embodiment, any acceptable ratio of SBO to linseed oil may be utilized.

Interesterification of soybean oil with linseed oil (70:30 mixture) may be accomplished by the following preferred method:

(i) transfer 175.0 g of refined, bleached and deodorized soybean oil and 75.00 g linseed oil (7:3 mixture) to a three neck 500 ml round bottom flask equipped with a gas inlet, mechanical stirrer, and thermometer;

(ii) after flushing the flask with argon, heat the flask in an oil bath while stirring the mixture at a moderate rate and maintaining a positive argon pressure within the flask by using a gas bubbler;

(iii) when the temperature of the contents has reached 70° C., 0.526 g, slowly add 95% sodium methoxide (weighed in a glove bag under argon) while gently purging the sodium methoxide vial with argon;

(iv) maintain reaction mixture at 70° C. for two hours after addition of sodium methoxide is complete (during this time, the reaction mixture will undergo a characteristic color change from yellow to light brown);

(v) after the reaction mixture cools to ambient temperature, transferred the mixture to a 2 liter separatory funnel using 300 ml diethyl ether to rinse the flask;

(vi) wash the mixture three times with 300 ml water while obtaining a nearly neutral final pH;

(vii) add 350 microliters of concentrated phosphoric acid and the stir the mixture;

(viii) extract with four 300 ml water washes, to obtain final wash pH of 5;

(ix) add 150 ml of ether and filter this solution through cotton, dry over sodium sulfate and then dry overnight over sodium sulfate;

(x) evaporate this solution with a rotary evaporator using aspirator pressure and then vacuum pump pressure to obtain 222.2 yellow clear oil which is purified by column chromatography on silica gel to remove residual fatty acids and monoglycerides.

Epoxidized interesterified soybean oil has the following formula:

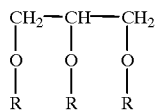

wherein R (each of the R's may be the same or different) is epoxidized linoleoyl, oleoyl, linolenoyl, or palmitoleoyl (in decreasing concentrations); or non-epoxidized palmitoyl, stearoyl, arachidoyl, behenoyl, myristoyl, or margaroyl (in minor concentrations). The material is substantially fully epoxidized.

Comparison of Plasticizer Performance

The present invention provides six improved vegetable (soybean) oil-based materials that are useful in vinyl chloride resins as primary plasticizers and as thermal stabilizers. Each of these compounds is intended to replace petroleum-based plasticizers such as DOP as the primary plasticizer in PVC formulations. The tables below present test data in a comparative format that indicates that the vegetable oil-based plasticizers of the present invention outperform, or are at least as good as DOP in a number of critical test categories.

The data in the taoles below were derived from tests on plasticized PVC films made by the following process: PVC resin (either a single resin, or combinations of resins) is dry blended with plasticizer and T-763 thermal stabilizer and extruded in a laboratory Brabender unit according to the procedure given in ASTM 2538-94. The resultant material is then pressed into a film using a Carver Press at 375° F., 10,000 PSI for 1 minute. Mechanical properties of plasticized films are determined by pulling the film clamped between the jaws of an Instron device at a cross-head speed of about twenty inches per minute. By constructing a stress-strain curve, modulus (a measure of stiffness), elongation (a measure of flexibility), and breaking strength (a measure of ultimate strength) can be calculated. Volatile loss is measured gravimetrically by determining the weight loss of plasticized film upon exposure to 70° C. for periods of 24 and 120 hours.

Typical preferred formulations of PVC include about 100 parts per weight of a vinyl chloride resin, about 10–230 parts per weight of a preferred plasticizer, and optionally about 1–3 parts of a preferred thermal stabilizer such as Witco T-763.

The viscosity of SBO derived plasticizers may be modified by esterification with mono, di or multi hydroxyl containing compounds. As the hydroxyl functionality increases, structure and higher molecular weight of the resultant ester leads to higher viscosity. The viscosity of plasticizer has a significant effect on rate of plasticizing and volatility of the plasticizer from PVC resin matrix. Higher plasticizer viscosity typically leads to slower up-take of plasticizer and reduced volatility and migration from the PVC resin matrix. Table 1 illustrates comparative viscosities for DOP and the plasticizers of the present invention.

Tables 2 and 3 present comparative data for modulus, elongation, break strength at room temperature and 70° C. respectively. Table 4 presents comparative data for volatile loss at three different loading levels. The data presented in Table 4 illustrate that the soybean oil-derived plasticizers of the present invention demonstrate significantly reduced exudation from PVC compared to phthalate plasticizers (DOP). Specifically at all loading levels the epoxidized pentaerythritol tetrasoyate and epoxidized product of soybean oil interesterified with linseed oil were significantly better than the DOP. For higher loadings (150 to 230 pph; pph=parts of plasticizer or additive per hundred parts of PVC resin) at about 120 hours the epoxidized product of soybean oil interesterified with linseed oil was an order of magnitude better than DOP at all loading levels. The epoxidized pentaerythritol tetrasoyate appeared to perform better overall than the epoxidized soybean oil. The epoxidized product of soybean oil interesterified with linseed oil performed about the same as ESO at low loadings, but significantly outperformed ESO at he higher loading.

Table 5 shows the results of placing the samples in hexane and extracting for about four hours. The epoxidized pentaerythritol tetrasoyate performed best in these tests with consistently the lowest weight loss at all loading levels. This is consistent with the teachings of the invention where the four sites for attachment of the various soya acids increase the eventual epoxy content of the molecule and decrease the probability of having one or two fully saturated fatty acids on the same molecule, thereby leading to decreased exudation. The epoxidized product of soybean oil interesterified with linseed oil appeared to perform about the same as the epoxidized soybean oil except at the highest loading where it performed best. Again this latter observation is consistent because the interesterified soybean oil will have only three sites for attachment of various saturated and unsaturated fatty acids present in the soya acid. However, the interesterified product of the present invention has a higher average epoxy content and a lower saturated fatty acid content per molecule. The introduced randomness at the molecular level from the teachings of the present invention will provide a plasticizer that is more compatible with PVC. Having four or more sites available on a polyol compared to three for glycerol reduces the probability of having a low unsaturation number or a saturated fatty acid which leads to lower exudation and migration. These results show that the best results will be obtained from with polysaccharides represented by epoxidized sucrose octasoyate because of their great number of attachment sites.

TABLE 1

Viscosity

| Plasticizer | Viscosity (cP) at 23° C. |
|---|---|
| Dioctyl Phthalate (DOP) [control] | 135 |
| Soybean Oil | 70 |
| Epoxidized Soybean Oil (ESO) | 440 |
| Epoxidized Pentaerythritol Tetrasoyate | 1380 |
| Epoxidized Sucrose Octasoyate | 3830 |
| Epoxidized Propylene Glycol Disoyate | 180 |
| Epoxidized Ethylene Glycol Disoyate | solid at 23° C. |
| Epoxidized Methyl Soyate | 15.1 |
| Epoxidized Product of Soybean Oil interesterified with Linseed Oil | 435 |

TABLE 2

Mechanical Properties at Room Temperature.

| Primary Plasticizer | Plasticizer Loading[a] (pph) | Mechanical Properties at Room Temperature | | | |
|---|---|---|---|---|---|
| | | 100% Modulus (PSI) | 300% Modulus (PSI) | Break Strength (PSI) | Elongation (%) |
| Dioctyl Phthalate (DOP) [control] | 100 | 532 | 1210 | 1470 | 283 |
| Epoxidized Pentaerythritol Tetrasoyate | 100 | 630 | 1556 | 2027 | 317 |
| Epoxidized Sucrose Octasoyate | 100 | 1039 | 1429 | 2114 | 237 |
| Epoxidized Product of Soybean Oil interesterified with Linseed Oil | 100 | 551 | 1214 | 1558 | 436 |
| Dioctyl Phthalate (DOP) | 60 | 1156 | 2469 | 2482 | 240 |
| Epoxidized Propylene Glycol Disoyate | 60 | 1109 | 2316 | 2615 | 257 |
| Epoxidized Ethylene Glycol Disoyate | 60 | 1186 | 2533 | 2436 | 247 |
| Epoxidized Methyl Soyate | 60 | 784 | 1779 | 2139 | 317 |

[a]loading levels of plasticizer in parts per hundred by weight of PVC resin (Geon Resin); 3 pph of a thermal stabilizer from Witco T-763 was used in all formulations

TABLE 3

Mechanical Properties at 70° C./120 hours.

| Primary Plasticizer | Plasticizer Loading[a] (pph) | Mechanical Properties at 70° C./120 hours | | | |
|---|---|---|---|---|---|
| | | 100% Modulus (PSI) | 300% Modulus (PSI) | Break Strength (PSI) | Elongation (%) |
| Dioctyl Phthalate (DOP) [control] | 100 | 632 | 1223 | 1557 | 260 |
| Epoxidized Pentaerythritol Tetrasoyate | 100 | 885 | 2030 | 2437 | 330 |
| Epoxidized Sucrose Octasoyate | 100 | 1185 | 1391 | 2179 | 240 |
| Epoxidized Product of Soybean Oil interesterified with Linseed Oil | 100 | 545 | 1043 | 1584 | 380 |
| Dioctyl Phthalate (DOP) | 60 | 1173 | 2401 | 2374 | 240 |
| Epoxidized Propylene Glycol Disoyate | 60 | 1156 | 2469 | 2482 | 240 |
| Epoxidized Ethylene Glycol Disoyate | 60 | 1176 | 2526 | 2446 | 247 |
| Epoxidized Methyl Soyate | 60 | 1066 | 2254 | 2375 | 290 |

[a]loading levels of plasticizer in parts per hundred by weight of PVC resin (Geon Resin); 3 pph of a thermal stabilizer from Witco T-763 was used in all formulation

TABLE 4

Volatile Loss in Percent at 70° C.

| Primary Plasticizer | Sample No. | Plasticizer Loading[a] (pph) | 24 hours | 48 hours | 72 hours | 120 hours |
|---|---|---|---|---|---|---|
| Dioctyl Phthalate (DOP) | 39-1 | 100 | 0.33 | 0.33 | 0.94 | 3.81 |
| Epoxidized Product of Soybean Oil interesterified with Linseed Oil | 52-1 | 100 | 0.11 | 0.14 | 0.13 | 0.15 |
| Epoxidized Pentaerythritol Tetrasoyate | 52-2 | 100 | 0.11 | 0.13 | 0.13 | 0.12 |
| Epoxidized Soybean Oil | 52-3 | 100 | 0.10 | 0.14 | 0.14 | 0.14 |
| Dioctyl Phthalate (DOP) | 58-1 | 150 | 0.34 | 0.59 | 0.89 | 1.39 |
| Epoxidized Product of Soybean Oil interesterified with Linseed Oil | 58-2 | 150 | 0.11 | 0.11 | 0.14 | 0.14 |
| Epoxidized Pentaerythritol Tetrasoyate | 58-3 | 150 | 0.06 | 0.06 | 0.04 | 0.04 |
| Epoxidized Soybean Oil | 58-4 | 150 | 0.12 | 0.10 | 0.12 | 0.12 |
| Dioctyl Phthalate (DOP) | 56-1 | 233 | 0.31 | 0.57 | 0.91 | 1.45 |
| Epoxidized Product of Soybean Oil interesterified with Linseed Oil | 56-2 | 233 | 0.09 | 0.11 | 0.12 | 0.12 |
| Epoxidized Pentaerythritol Tetrasoyate | 56-3 | 233 | 0.11 | 0.06 | 0.03 | — |
| Epoxidized Soybean Oil | 56-4 | 233 | 0.11 | 0.37 | 0.35 | 0.53 |

Film thickness was about 0.022 inch nominal +/− about 0.007 inch

TABLE 5

Hexane Extraction[a].

| Primary Plasticizer | Sample No. | Plasticizer Loading[a] (pph) | % Loss[b] |
|---|---|---|---|
| Dioctyl Phthalate (DOP) | 39-1 | 100 | 42.2 |
| Epoxidized Product of Soybean Oil interesterified with Linseed Oil | 52-1 | 100 | 9.4 |

TABLE 5-continued

Hexane Extraction[a].

| Primary Plasticizer | Sample No. | Plasticizer Loading[a] (pph) | % Loss[b] |
|---|---|---|---|
| Epoxidized Pentaerythritol Tetrasoyate | 52-2 | 100 | 2.6 |
| Epoxidized Soybean Oil | 52-3 | 100 | 8.3 |
| Dioctyl Phthalate (DOP) | 58-1 | 150 | 51.0 |
| Epoxidized Product of Soybean Oil interesterified with Linseed Oil | 58-2 | 150 | 19.6 |
| Epoxidized Pentaerythritol Tetrasoyate | 58-3 | 150 | 8.6 |
| Epoxidized Soybean Oil | 58-4 | 150 | 17.0 |
| Dioctyl Phthalate (DOP) | 56-1 | 233 | 62.7 |
| Epoxidized Product of Soybean Oil interesterified with Linseed Oil | 56-2 | 233 | 36.1 |
| Epoxidized Pentaerythritol Tetrasoyate | 56-3 | 233 | 19.2 |
| Epoxidized Soybean Oil | 56-4 | 233 | 43.7 |

[a]4 hour exposure/24 hour dry
[b]starting samples weighed approximately 0.5 g +/− about 0.1 g.
[c]film thickness about 0.022 inch +/− about 0.007 inch While the above description contains many specificities, these should not be construed as limitations on the scope of the invention, but rather as exemplification of preferred embodiments. Numerous other variations of the present invention are possible, and it is not intended herein to mention all of the possible equivalent forms or ramifications of this invention. Various changes may be made to the present invention without departing from the scope of the invention.

We claim:

1. A plasticized vinyl chloride composition, comprising:
   (a) about 100 parts by weight of at least one vinyl chloride resin;
   (b) about 10 to 230 parts by weight of a primary plasticizer compounded with said at least one vinyl chloride resin, wherein said plasticizer comprises a fatty acid product derived from a vegetable oil having at least 80% by weight of unsaturated fatty acids, wherein said unsaturated fatty acids are substantially fully esterified with a monool or a polyol, and said esterified unsaturated fatty acids have been substantially fully epoxidized;
   wherein, in said vegetable oil derived plasticizer,
   (1) said fatty acid product is derived from direct esterification of fatty acids of said vegetable oil with a monool or a polyol;
   (2) said fatty acid product is derived from transesterification of said vegetable oil with monools or polyols;
   (3) said fatty acid product is derived from said vegetable oil interesterified with another vegetable oil having a higher degree of unsaturation; and/or
   (4) said fatty acid product is derived from fatty acids from said vegetable oil esterified with a monool and interesterified with a polysaccharide carboxylic acid ester.

2. The composition of claim 1, wherein said plasticized vinyl chloride composition is essentially free of dioctyl phthalate.

3. The composition of claim 1, wherein when said alcohol is a polyol and said fatty acids derived from said vegetable oil are substantially randomly positioned on the hydroxyl sites of said polyol.

4. The composition of claim 1, wherein said vegetable oil is selected from the group consisting of,
   canola oil (iodine value about 100–115),
   corn oil (iodine value about 118–128),
   linseed oil (iodine value about 170–200),
   rapeseed oil (iodine value about 100–115),
   safflower oil (iodine value about 140–150),
   soybean oil (iodine value about 120–143),
   sunflower oil (iodine value about 125–140),
   tall oil (iodine value about 140–190), and
   tung oil (iodine value about 180) and mixtures thereof.

5. The composition of claim 1, wherein said plasticizer is derived from a vegetable oil having an iodine value above about 100.

6. The composition of claim 1, wherein said plasticizer is epoxidized pentaerythritol tetrasoyate having the formula:

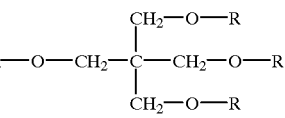

wherein R (each of the R's may be the same or different) is randomly selected from the group consisting of epoxidized linoleoyl, epoxidized oleoyl, epoxidized linolenoyl, epoxidized palmitoleoyl, non-epoxidized palmitoyl, non-epoxidized stearoyl, non-epoxidized arachidoyl, non-epoxidized behenoyl, non-expoxidized myristoyl, and non-epoxidized margaroyl.

7. The composition of claim 1, wherein said plasticizer is epoxidized propylene glycol disoyate having the formula:

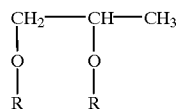

wherein R (each of the R's may be the same or different) is randomly selected from the group consisting epoxidized linoleoyl, epoxidized oleoyl, epoxidized linolenoyl, epoxidized palmitoleoyl, non-epoxidized palmitoyl, non-epoxidized stearoyl, non-epoxidied arachidoyl, non-epoxidized behenoyl, non-epoxidized myristoyl, and non-epoxidized margaroyl.

8. The composition of claim 1, wherein said plasticizer is epoxidized ethylene glycol disoyate having the formula:

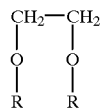

wherein R (each of the R's may be the same or different) is randomly selected from the group consisting of epoxidized linoleoyl, epoxidized oleoyl, epoxidized linolenoyl, epoxidized palmitoleoyl, non-epoxidized palmitoyl, non-epoxidized stearoyl, non-epoxidized arachidoyl, non-epoxidized behenoyl, non-epoxidized myristoyl, and non-epoxidized margaroyl.

9. The composition of claim 1, wherein said plasticizer is a mixture of epoxidized methyl soyates having the formula:

wherein R is randomly selected from the group consisting of epoxidized linoleoyl, epoxidized oleoyl, epoxidized linolenoyl, epoxidized palmitoleoyl, non-epoxidized palmitoyl, non-epoxidized stearoyl, non-epoxidized arachidoyl, non-epoxidized behenoyl, non-epoxidized myristoyl, and non-epoxidized margaroyl.

10. The composition of claim 1, wherein said plasticizer is epoxidized sucrose octasoyate having the formula:

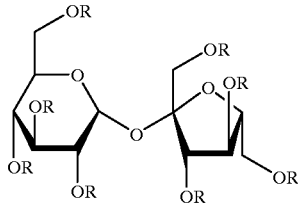

wherein R (each of the R's may be the same or different) is selected from the group consisting of epoxidized linoleoyl, epoxidized oleoyl, epoxidized linolenoyl, epoxidized palmitoleoyl, non-epoxidized palmitoyl non-epoxidized stearoyl, non-epoxidized arachidoyl, non-epoxidized behenoyl, non-epoxidized myristoyl, and non-epoxidized margaroyl.

11. The plasticizer of claim 10, wherein each R is randomly selected from said group.

12. The composition of claim 1, wherein said plasticizer is the epoxidized product of a first vegetable oil interesterified with a second vegetable oil, and having the formula:

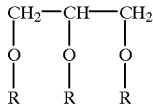

wherein R (each of the R's may be the same or different) is randomly selected from the group consisting of epoxidized linoleoyl, epoxidized oleoyl, epoxidized linolenoyl, epoxidized palmitoleoyl, non-epoxidized palmitoyl, non-epoxidized stearoyl, non-epoxidized arachidoyl, non-epoxidized behenoyl, non-epoxidized myristoyl, and non-epoxidized margaroyl.

13. The plastidzer according to claim 12, wherein said first vegetable oil has an iodine value greater than 100 and the second vegetable oil has an iodine value greater than the first vegetable oil.

14. The plasticizer of claim 12, wherein said first vegetable oil is soybean oil, and said second vegetable oil is linseed oil.

15. Epoxidized sucrose octasoyate having the formula:

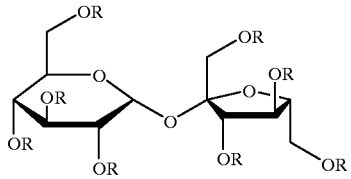

wherein R (each of the R's may be the same or different) is selected from the group consisting of epoxidized linoleoyl, epoxidized oleoyl, epoxidized linolenoyl, epoxidized palmitoleoyl, non-epoxidized palmitoyl, non-epoxidized stearoyl, non-epoxidized arachidoyl, non-epoxidized behenoyl, non-epoxidized myristoyl, and non-epoxidized margaroyl.

16. The composition of claim 15, wherein each R is randomly selected from said group.

17. The epoxidized product of a first vegetable oil interesterified with a second vegetable oil having the formula:

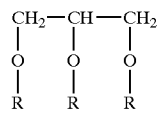

wherein R (each of the R's may be the same or different) is randomly selected from the group consisting of epoxidized linoleoyl, epoxidized oleoyl, epoxidized linolenoyl, epoxidized palmitoleoyl, non-epoxidized palmitoyl, non-epoxidized stearoyl, non-epoxidized arachidoyl, non-epoxidized behenoyl, non-epoxidized myristoyl, and non-epoxidized margaroyl.

18. The composition of claim 17, wherein said first vegetable oil is soybean oil, and said second vegetable oil is linseed oil.

19. A plasticized vinyl chloride composition, comprising:
(a) about 100 parts by weight of at least one vinyl chloride resin;
(b) about 10 to 100 parts by weight of a plasticizer compounded with said at least one vinyl chloride resin, wherein said plasticizer is epoxidized pentaerythritol tetrasoyate; and
(c) about 1–3 parts thermal stabilizer compounded with said at least one vinyl chloride resin and said plasticizer.

20. A plasticized vinyl chloride composition, comprising:
(a) about 100 parts by weight of at least one vinyl chloride resin;
(b) about 10 to 100 parts by weight of a plasticizer compounded with said at least one vinyl chloride resin, wherein said plasticizer is epoxidized propylene glycol disoyate; and
(c) about 1–3 parts thermal stabilizer compounded with said at least one vinyl chloride resin and said plasticizer.

21. A plasticized vinyl chloride composition, comprising:
(a) about 100 parts by weight of at least one vinyl chloride resin;
(b) about 10 to 100 parts by weight of a plasticizer compounded with said at least one vinyl chloride resin, wherein said plasticizer is epoxidized ethylene glycol disoyate; and
(c) about 1–3 parts thermal stabilizer compounded with said at least one vinyl chloride resin and said plasticizer.

22. A plasticized vinyl chloride composition, comprising:
(a) about 100 parts by weight of at least one vinyl chloride resin;
(b) about 10 to 100 parts by weight of a plasticizer compounded with said at least one vinyl chloride resin, wherein said plasticizer is epoxidized methyl soyate; and
(c) about 1–3 parts thermal stabilizer compounded with said at least one vinyl chloride resin and said plasticizer.

23. A plasticized vinyl chloride composition, comprising:
(a) about 100 parts by weight of at least one vinyl chloride resin;
(b) about 10 to 100 parts by weight of a plasticizer compounded with said at least one vinyl chloride resin, wherein said plasticizer is epoxidized sucrose octasoyate; and
(c) about 1–3 parts thermal stabilizer.

24. A plasticized vinyl chloride composition, comprising
(a) about 100 parts by weight of at least one vinyl chloride resin; and
(b) about 10 to 100 parts by weight of a plasticizer compounded with said at least one vinyl chloride resin, wherein said plasticizer is the epoxidized product of a first ester interesterifted with a second ester; and
(c) about 1–3 parts thermal stabilizer compounded with said at least one vinyl chloride resin and said plasticizer.

25. A plasticized vinyl chloride composition, comprising
(a) about 100 parts by weight of at least one vinyl chloride resin; and
(b) about 10 to 100 parts by weight of a plasticizer compounded with said at least one vinyl chloride resin, wherein said plasticizer is the epoxidized product of a first vegetable oil interesterified with a second vegetable oil; and
(c) about 1–3 parts thermal stabilizer compounded with said at least one vinyl chloride resin and said plasticizer.

26. The composition of claim 25, wherein said first vegetable oil is soybean oil, and said second vegetable oil is linseed oil.

27. The composition of claim 1, wherein said plasticizer comprises a mixture of epoxidized pentaerythritol tetrasoyates having the formula:

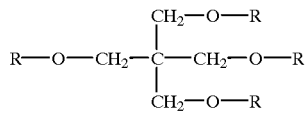

wherein R (each of the R's may be the same or different) is randomly selected from the group consisting of:
(i) substantially fully epoxidized unsaturated fatty acids derived from a vegetable oil; and
(ii) non-epoxidized saturated fatty acids derived from a vegetable oil;

wherein said vegetable oil has greater than about 80% unsaturated fatty acids and/or an iodine number above about 100.

28. The composition of claim 1, wherein said plasticizer comprises a mixture of epoxidized propylene glycol disoyates having the formula:

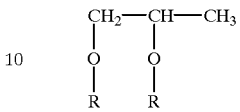

wherein R (each of the R's may be the same or different) is randomly selected from the group consisting of epoxidized linoleoyl, epoxidized oleoyl, epoxidized linolenoyl, epoxidized palmitoleoyl, non-epoxidized palmitoyl, non-epoxidized stearoyl, non-epoxidized arachidoyl, non-epoxidized behenoyl, non-epoxidized myristoyl, and non-epoxidized margaroyl.

29. The composition of claim 1, wherein said plasticizer comprises a mixture of epoxidized ethylene glycol disoyates having the formula:

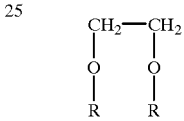

wherein R (each of the R's may be the same or different) is randomly selected from the group consisting of epoxidized linoleoyl, epoxidized oleoyl, epoxidized linolenoyl, epoxidized palmitoleoyl, non-epoxidized palmitoyl, non-epoxidized stearoyl, non-epoxidized arachidoyl, non-epoxidized behenoyl, non-epoxidized myristoyl, and non-epoxidized margaroyl.

* * * * *

UNITED STATES PATENT AND TRADEMARK OFFICE
CERTIFICATE OF CORRECTION

PATENT NO. : 6,797,753 B2
DATED : September 28, 2004
INVENTOR(S) : Herman P. Benecke, Bhima R. Vijayendran and Joel D. Elhard It is certified that error appears in the above-identified patent and that said Letters Patent is hereby corrected as shown below:

Title page,
Item [73], Assignee, "Columbus, MA (US)" should be -- Columbus, OH (US) --

Column 14,
Line 4, "taoles" should be -- tables --

Column 19,
Line 42, "plastidzer" should be -- plasticizer --

Signed and Sealed this

Twenty-fifth Day of January, 2005

JON W. DUDAS
*Director of the United States Patent and Trademark Office*